J. L. CREVELING.
ELECTRIC SYSTEM.
APPLICATION FILED FEB. 9, 1920.
1,343,765.
Patented June 15, 1920.
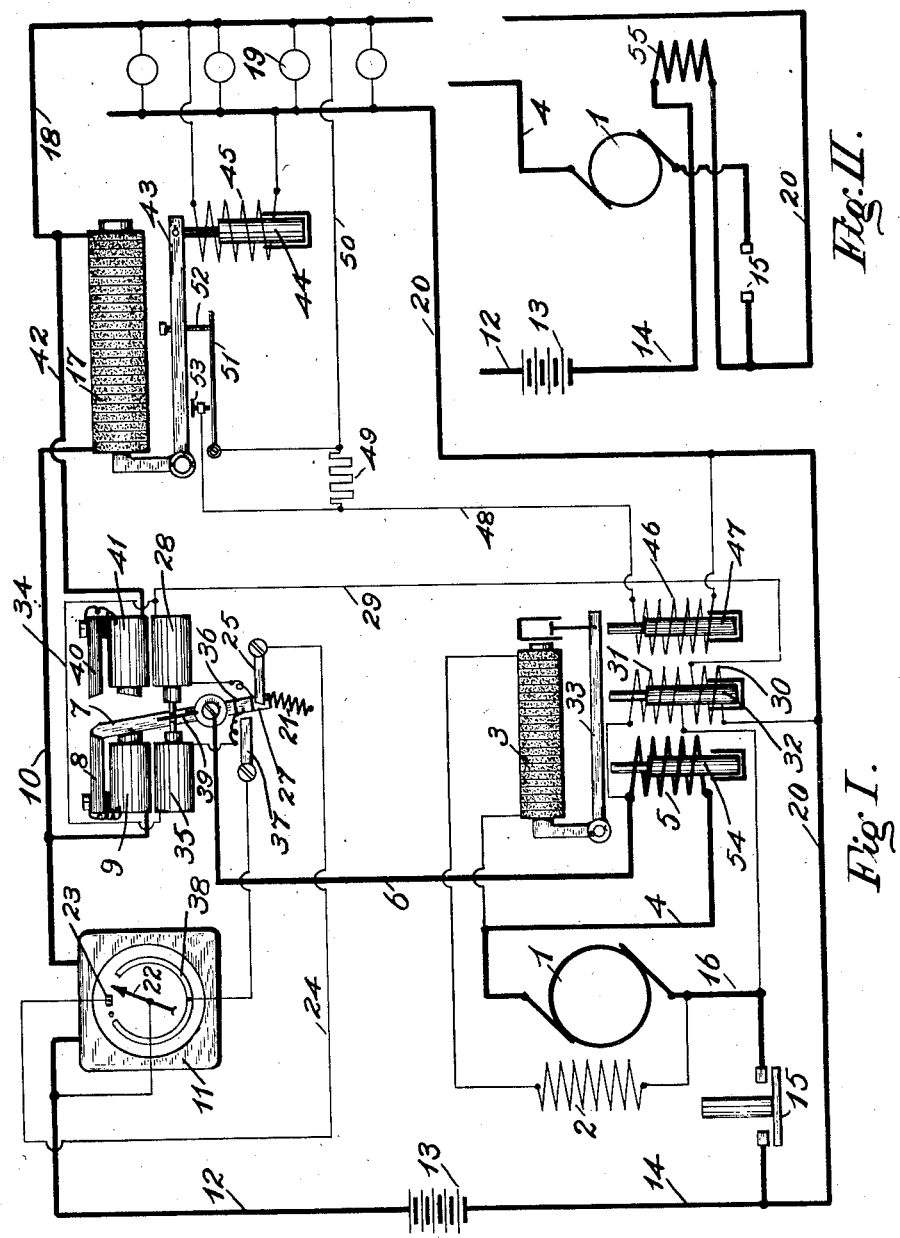
INVENTOR

UNITED STATES PATENT OFFICE.

JOHN L. CREVELING, OF TUCSON, ARIZONA, ASSIGNOR TO GOULD COUPLER COMPANY, A CORPORATION OF NEW YORK.

ELECTRIC SYSTEM.

1,343,765.   Specification of Letters Patent.   Patented June 15, 1920.

Application filed February 9, 1920. Serial No. 357,477.

*To all whom it may concern:*

Be it known that I, JOHN L. CREVELING, a citizen of the United States, residing at Tucson, county of Pima, and State of Arizona, have invented new and useful Improvements in Electric Systems, set forth in the annexed specification and drawing, forming a part thereof.

This is a continuation, in part, of my application for patent for improvement in electric systems, Serial No. 117,245, filed August 28, 1916.

My invention is particularly applicable to that class of electric systems wherein it is desired to operate lamps or other translating devices by means of a storage battery and a coöperating source of electrical potential difference wherein the source at times supplies current to the battery and at times to the translating devices which are operated by the battery alone when the source is ineffective.

My invention has for a particular object to provide means whereby a system of this character may be automatically operated to properly charge the battery and maintain the lamps or other translating devices.

As my invention is particularly applicable to that type of system wherein a variable speed generator is used to supply lamps or other translating devices while running above a critical speed, and also to charge a storage battery which maintains the translating devices when the generator is below its critical speed, such as are now used extensively for the lighting of railway cars, it will be described with particular reference to such a system.

Figure I is a diagrammatic representation of one type of electric system, which is shown for the purpose of explaining one embodiment of my invention; and Fig. II is a diagrammatic representation of a portion of a system similar to Fig. I embodying a modification which may be made in the system of Fig. I.

In Fig. I, the source of electrical potential difference is indicated as a dynamo 1, having a shunt field winding 2 in series with which there is placed a regulator, indicated as a carbon pile, 3, the manipulation of which may serve to regulate the source of potential difference in a manner well known in the art. The positive brush of the generator is connected as by the lead 4 with one end of the solenoid 5, the opposite end of which is connected by the wire 6 with the insulated lever of magnetic material indicated at 7, which is shown in the drawing as in electrical communication with the flexible contact member 8, connected with one end of the winding of an electromagnet 9, the opposite end of which is connected with the lead 10. One end of the lead 10 is connected with one terminal of a suitable quantitative measuring device, in this instance indicated as an ampere-hour meter, the other terminal of which is connected with the lead 12 which is carried to the positive side of the storage battery 13, the negative of which is connected as by wire 14 with one side of a suitable switch 15, the other side of which is connected as by lead 16 with the negative brush of the generator.

Switch 15 is preferably one of the automatic variety adapted to close its circuit when the generator voltage is substantially equal or slightly in excess of that of the battery and to open its circuit when the generator voltage is substantially equal or very slightly below that of the battery, in such manner as to prevent back discharge through the generator. And as such switches are well known in the art and the particular type chosen forms no part of my present invention, the mere presence of such a switch is indicated, and details of construction are purposely omitted for the sake of clearness, it being understood that any suitable type of such switch may be used.

The other end of the lead 10 is connnected with one terminal of a suitable translation circuit regulator indicated in this instance as a carbon pile 17, the other terminal of which is connected as by lead 18 with one side of the lamps or other translating devices 19 which have their opposite terminals connected with the lead 20 which is carried to the lead 14. 21 is a compression spring tending to hold the lever 7 in the position indicated in the drawing until acted upon, as will hereinafter be explained. The ampere-hour meter 11 is provided with an indicating hand 22 which is moved in a counter-clockwise direction by current charging the battery, and in a clockwise direction by current flowing from the battery to the translating devices. And it will be obvious that any suitable type of measuring device may be employed, including such types as allow a greater charge to be given to the battery than is taken from it for the same amount of motion of the indicator, as are now well known in the art. The hand 22 is insulated from the other parts of the meter and connected with the lead 12. 23 is an insulated contact member or segment with which the hand 22 comes into electrical connection when rotated sufficiently in a counter-clockwise direction, as by charging current delivered to the battery. 23 is connected as by wire 24 with the contact wiper 25 which is in electrical communication with the insulated member 27 carried by the lever 7 when the said lever is in the position indicated in the drawing. 27 is connected with one end of the winding of the electromagnet 28, the other end of which is connected as by wire 29 with one end of a solenoid 30, the opposite end of which is connected with the lead 20. 31 is a solenoid adapted to coöperate with the solenoid 30 and is in shunt across the generator, as indicated. The windings 30 and 31 when energized each tend to lift the core 32 and raise lever 33 in such manner as to increase the resistance of the carbon pile or regulator 3 and cut down the field excitation of the generator, for purposes which will hereinafter be explained. The wire 29 is connected as by wire 34 with one end of the winding of electromagent 35, the opposite end of which is connected with the insulated contact member 36 carried by the lever 7. 37 is a contact member adapted to make contact with the member 36 if the lever 7 be swung in a clockwise direction; and the said contact 37 is connected with the segment or contact 38 with which the hand 22 causes electrical communication when revolved in a clockwise direction, as upon discharge of the battery. 39 is a leaf spring having one of its ends attached to the lever 7 and having its free end movably engaged by an engaging member of non-magnetic material which unites the cores of the solenoids 28 and 35. 40 is a contact member adapted to make contact with the lever 7 if the same be swung in a clockwise direction; and the said lever 7 and spring 21 are so arranged that if the lever be revolved in a clockwise direction beyond half way toward the contact 40, the said spring will by passing the center line snap the lever 7 quickly into contact with 40, in which position the said spring will tend to hold the lever until rotated in a counter-clockwise direction slightly more than half way toward the contact 8, whereupon the said spring 21 will snap the member 7 quickly into the position indicated in the drawing. The contact 40 is connected with one end of the winding of the electromagnet 41, the opposite end of which is connected as by wire 42 with the wire 18. 43 is a lever the operation of which controls the regulator 17; while 44 is a core of magnetic material operating the lever 43. 45 is a voltage solenoid in shunt across the translation circuit and affecting the core 44 in such manner as to maintain the voltage upon the translating devices constant by manipulation of the regulating element 17. 46 is a voltage solenoid tending to lift the core 47 and having one of its ends connected with the lead 20, and the opposite end connected as by wire 48 with one end of a suitable resistance 49, the opposite end of which is connected by wire 50 with the lead 18. 51 is a contact spring which may be pressed downwardly by the adjustable screw 52. 53 is a contact screw adapted to arrest upward motion of the spring 51 by electrical contact therewith. The members 51 and 53 are connected in shunt around the resistance 49, for a purpose that will hereinafter be pointed out. The solenoid 5 is provided with a core 54 which the said solenoid tends to raise when energized into contact with the lever 33, in such manner as to operate the pile 3.

In Fig. II like numerals are used to indicate like parts and the only modification intended to be brought out by the use of this figure resides in the coil 55, shown in series with the battery lead 14, which may be used in place of the coil 5 in series with the generator lead as indicated in Fig. I.

An operation of my invention is substantially as follows:

With the generator at rest and the various devices in the positions shown in the drawing, switch 15 will be open and the translating devices may be supplied by the storage battery 13 through lead 12, meter 11, lead 10, regulator 17 and lead 18 to the translating devices 19, return being made through the lead 20 and lead 14. The meter 11 is so arranged that the current flowing from the battery therethrough, as above mentioned, will cause the hand 22 to revolve in a clockwise direction at a proper rate; and, after measuring a predetermined amount of current as may be desired, the same will come into contact with the segment 38 and connect the wiper 37 electrically with the lead 12. With the generator connected with the lead 10, as it is indicated in the drawing, this will cause no effect upon the system, as the contact 37—36 is broken. If the generator voltage be brought up until sufficient to charge the battery, switch 15 will close and current will flow from the generator through lead 4, solenoid 5, lead 6, lever 7, contact member 8, magnet 9 to lead 10. And if translating devices are in circuit, current will flow from lead 10, through regulator 17, lead 18

18, translating devices 19, lead 20 to the switch 15; and also from lead 10 through the meter 11, lead 12, battery 13 and lead 14 to the switch 15, from which return to the generator takes place through lead 16. The current passing through the coil 5 tends to lift the core 54; and I so arrange the same that, if the current tend to increase beyond a certain desirable predetermined limit, the coil 5 will lift the core 54 into contact with the lever 33 and so manipulate the resistance 3 as to affect the current in the field coil 2 in such manner as to keep this predetermined current from being appreciably exceeded.

I so arrange the coil 45 with respect to the core 44 and other coöperating parts that, if the voltage across the translating circuit tend to increase beyond a desired maximum working voltage, the coil 45 will lift the core 44 and operate lever 43 in such manner as to increase the resistance 17 and hold the desired voltage upon the translating devices within a very narrow margin. I so arrange the coil 46 which is in shunt across the translating circuit that, when the resistance 49 is in series with the said coil, the core 47 will not be lifted when the proper voltage is held upon the translating circuit, or even slightly exceeded as by a small amount insufficient to cause any noticeable difference in the luminosity of the lamps. And I so arrange the said coil and core that, if the resistance 49 be short-circuited and the proper voltage upon the translating circuit, coil 46 will just be able to lift the core 47 or hold the same in substantially a floating condition. And, if the voltage across the translating circuit be increased very slightly, the coil 46 will raise the core 47 so as to manipulate the resistance 3 and affect the generator, as will hereinafter be more fully pointed out.

With the generator running, as above outlined, and connected with the lead 10, as above mentioned, the full generator voltage is impressed upon the coil 31. And this coil is so arranged with respect to the core 32 that the normal operating voltage of the generator will, under no condition, raise the core 32 without assistance. But, if the generator voltage increase above a predetermined limit beyond that to be met when the battery 13 is working properly, the coil 31 will raise the core 30 and, by lifting the lever 33, affect the pile 3 to hold the generator voltage from exceeding this predetermined limit by an appreciable amount. Therefore, while the coil 31 ordinarily performs no regulating function in the ordinary operation of the system and charging of the battery, it will upon the breaking of a battery lead or connection prevent the generator voltage from exceeding a predetermined protective value and hold this protective value of the voltage constant throughout speed changes of the generator until the lead be repaired or the battery brought into proper operative condition, when the said coil 31 will cease to perform any operating function.

With the generator charging the battery, as above outlined, the charging current flowing through the meter 11 will cause the hand 22 to move in a counterclockwise direction. And when the proper charge has been measured as having been delivered to the battery, the hand 22 will make contact with 23 and current will flow from the lead 12, through hand 22, contact 23, wire 24, wiper 25, contact 27, coil 28, wire 29 and coil 30 to the lead 20. The current flowing through magnet 28 will attract its plunger and draw the same in a right-hand direction and bend the leaf-spring 39 toward the right, which will tend to revolve the lever 7 in a clockwise direction. The lever 7 will, however, be held in the position shown in the drawing, so long as any appreciable current is flowing from the generator through the magnet 9. The current in the coil 30 will now assist the coil 31; and I so arrange the coil 30 that the combined action of these coils will raise the core 32 and swing the lever 33 to increase the resistance 3 and cut down the field of the generator and thereby lower its voltage until the current flowing in the magnet 9 is substantially or entirely suppressed, whereupon the said magnet 9 will release the lever 7 and the spring 39 will snap the same quickly into its other operative position with the assistance of spring 21, in an obvious manner. This will connect the generator through the lead 6 and lever 7 with the contact member 40 and simultaneously break the contact at 25—27, which will break the circuit through magnet 28, wire 29 and coil 30, whereupon the core 32 will descend and allow the generator voltage to pick up, and the generator will supply current directly to the translating circuit through contact 40, magnet 41 and wire 42 to the lead 18. And, as the now rising generator voltage tends to increase the voltage across the translating circuit, coil 45 will raise the core 44 and increase the resistance 17 in an effort to hold the proper voltage upon the translating devices. And when a considerable resistance is inserted at 17, and discharging from the battery to the translating circuit substantially terminated thereby, 51 may make contact with 53, short-circuiting the resistance 49 and placing the coil 46 directly across the translating circuit, which coil through the instrumentality of the core 47 and lever 33 will so manipulate resistance 3 that the translation circuit voltage will now be the maximum voltage which the generator can attain, and the generator will supply the translating devices directly at their normal operating voltage or within limits so narrow as to cause no noticeable effect upon the translating devices.

With the generator thus operating and the lever 7 swung into the operating position, which is opposite to that shown in the drawing, establishing connection with the member 40, 36 will be in electrical communication with the member 37. And if the generator slow down until unable to supply all the translating circuit current and maintain the full translating circuit voltage upon the devices 19, coil 45 will allow the core 44 to descend and, by reducing the resistance 17, allow current to flow back from the battery and pick up the translating circuit load as the voltage of the generator falls off. And as the voltage of the generator sinks very slightly below the translating circuit voltage, coil 45 will allow the contact 51—53 to be broken, throwing in resistance 49 and weakening the coil 46 slightly so as to throw the entire regulation of the translating circuit upon the coil 45. And if the generator voltage fall still lower, it may cease to supply any current, and switch 15 may open, cutting the generator out of circuit and preventing back discharge through the same even though it come to rest.

If, now, the voltage of the generator be brought up again, switch 15 will close; and when the voltage is sufficient to supply the translating devices, the generator will supply the same and coil 45 will increase the resistance 17 and take the load off of the battery and shift it all on to the generator which will again supply the translating devices at substantially their normal voltage throughout speed changes without assistance, and no substantial current will be drawn from the battery save during such times as the generator runs below its critical voltage or stops, and at no time can the current supplied by the generator exceed that maximum desired output determined by the coil 5. If sufficient current be drawn from the battery that it may be desired to have the same again charged, which amount may readily be determined by the arrangement of hand 22 and segment 38, the hand 22 will come into contact with 38 whereupon current will flow from the lead 12 through the hand 22, contact 38, wiper 37, contact 36, magnet 35, wire 34, wire 29 and coil 30 to the lead 20. And if the generator be inoperative or running at low speed so as to deliver no current, the magnet 35 will draw its core in a left-hand direction so as to bend the spring 39 in a counter-clockwise direction and pull the lever 7 toward the position shown in the drawing; and the said lever will be snapped by the spring 21 into the position indicated in the drawing and connect the lead 6 with the lead 10. This action will break the contact at 36—37 and prevent waste of current from the battery while the generator is below critical speed. If the generator now be brought up to speed, its connections and operation will be the same as at the beginning of the above outlined operation.

If at any time while the generator is running and connected by the lever 7 and contact 40 directly with the translating circuit and supplying but a part of the current supplied to the translating devices, sufficient current should be drawn from the battery that the hand 22 comes into contact with 38, the excitation of the coil 30, due to such contact as above mentioned, will cause the coil 30 together with the coil 31 to raise the core 32 and increase the resistance 3 until the generator output is suppressed, whereupon coil 41 will release lever 7 and it will be snapped into the position shown in the drawing, in a manner similar to that above outlined.

The operation of that modification intended to be brought out by the use of Fig. II is the same as that described with respect to Fig. I with the exception that the battery current is held from exceeding a predetermined limit by the coil 55 instead of the total current being thus limited by the coil 5 of Fig. I.

From the foregoing it will be noted that I have produced a system wherein a variable speed generator, such as a dynamo driven from the axle of a moving car, may be used to charge a storage battery and maintain lamps or other translating devices which are operated by the battery when the generator is inoperative and wherein when the battery has a predetermined charge given to it the dynamo is automatically prevented from charging the battery any further and is connected with the translating devices to operate the same at the translating circuit voltage with very small, if any, loss, for the mere purpose of regulation. Also that if at any time the voltage upon the generator tend to rise and approach a destructive limit, due to the breaking of a battery main, or some other such cause, the generator will be protected from injury in case it be connected with the charging circuit, in which event it will supply the translating devices, so long as it runs above its critical speed, at their proper normal voltage through the regulator 17. While if breakage of a battery lead takes place when the generator is connected with the translating circuit, it will supply the translating devices directly at their proper voltage.

It will also be noted that the coil 45 and the coil 46 have for their functions to hold upon the translating devices substantially the same voltage, the former by manipulating the resistance 17 and the latter by controlling the generator voltage; and that by means of a very simple arrangement I cause the work of regulating the translating circuit to be transferred from one coil to the other automatically and, under proper conditions, to hold the translating circuit voltage constant within very narrow limits.

I do not wish in any way to limit myself to any of the exact constructions or details of devices or modes of operation above outlined to show concrete cases merely embodying the essentials of my invention, which is as set forth in the following claims.

I claim—

1. The combination with a source of electrical potential difference, a storage battery circuit and a translating circuit, of means for connecting the source under certain conditions with the battery circuit and under other conditions with the translating circuit, and means whereby activity of the source prevents operation of said connecting means.

2. The combination with a source of electrical potential difference, a storage battery circuit and a translating circuit, of means for connecting the source under certain conditions with the battery circuit and under other conditions with the translating circuit comprehending a switch, operating mechanism therefor, and means allowing operation of said switch when the current supplied by the source falls below a predetermined limit only.

3. The combination with a source of electrical potential difference, a storage battery circuit and a translating circuit, of means for connecting the source under certain conditions with a battery circuit and under other conditions with the translating circuit comprehending a switch, automatic operating mechanism therefor affected by the state of charge of the battery, and means for preventing operation of said switch while the current supplied by the source remains above a predetermined standard.

4. The combination with a source of electrical potential difference, a storage battery circuit and a translating circuit, of means for connecting the source under certain conditions with the battery circuit and under other conditions with the translating circuit comprehending a switch, operating mechanism therefor, and means for preventing operation of said switch while the current supplied by the source remains above a predetermined standard and allowing operation thereof when the current from the source falls below this standard.

5. The combination with a controllable source of electrical potential difference, a regulator therefor, a storage battery circuit and a translating circuit, of means for connecting the source with the battery circuit under certain conditions and with the translating circuit under other conditions, operating means therefor, means controlling said operating means affected by the condition of the battery, and means controlling the effect produced by said operating means affected by the current supplied by the source.

6. The combination with a controllable source of electrical potential difference, a regulator therefor, a storage battery circuit and a translating circuit, of means for connecting the source with the battery circuit under certain conditions and with the translating circuit under other conditions, operating means therefor, means controlling said operating means affected by the current supplied to the battery, and means controlling the effect produced by said operating means affected by the current supplied by the source and allowing said operating means to shift the connection of the source from the battery circuit to the translating circuit and vice versa only when the current output of the source is below a predetermined value.

7. The combination with a controllable source of electrical potential difference, a regulator therefor, a storage battery circuit and a translating circuit, of means for connecting the source with the battery circuit under certain conditions and with the translating circuit under other conditions, operating means therefor, means controlling said operating means affected by the current supplied by the battery, and means controlling the effect produced by said operating means affected by the current supplied by the source and allowing said operating means to shift the connection of the source from the battery circuit to the translating circuit and vice versa only when the current output of the source is below a predetermined value.

8. The combination with a controllable source of electrical potential difference, a regulator therefor, a storage battery circuit and a translating circuit, of means for connecting the source with the battery circuit under certain conditions and with the translating circuit under other conditions, operating means therefor, means controlling said operating means affected by the current supplied to and by the battery, and means controlling the effect produced by said operating means affected by the current supplied by the source and allowing said operating means to shift the connection of the source from the battery circuit to the translating circuit and vice versa only when the current output of the source is below a predetermined value.

9. The combination with a controllable source of electrical potential difference, a regulator therefor, a storage battery circuit and a translating circuit, of means for connecting the source with the battery circuit under certain conditions and with the translating circuit under other conditions, operating means therefor, means controlling said operating means affected by the condition of the battery, and means controlling the effect produced by said operating means affected by the current supplied by the source and allowing said operating means to shift the connection of the source from the battery circuit to the translating circuit and vice versa only when the current output of the source is below a predetermined value.

10. The combination with a controllable source of electrical potential difference, a regulator therefor, a storage battery circuit and a translating circuit, of means for connecting the source with the battery circuit under certain conditions and with the translating circuit under other conditions, operating means therefor, means controlling said operating means affected by the current supplied to the battery, and means controlling the effect produced by said operating means affected by the current supplied by the source.

11. The combination with a controllable source of electrical potential difference, a regulator therefor, a storage battery circuit and a translating circuit, of means for connecting the source with the battery circuit under certain conditions and with the translating circuit under other conditions, operating means therefor, means controlling said operating means affected by the current supplied by the battery, and means controlling the effect produced by said operating means affected by the current supplied by the source.

12. The combination with a controllable source of electrical potential difference, a regulator therefor, a storage battery circuit and a translating circuit, of means for connecting the source with the battery circuit under certain conditions and with the translating circuit under other conditions, operating means therefor, means controlling said operating means affected by the current supplied to and by the battery, and means controlling the effect produced by said operating means affected by the current supplied by the source.

13. The combination with a controllable source of electrical potential difference, a regulator therefor, a storage battery circuit and a translating circuit, of means for connecting the source with the battery circuit under certain conditions and with the translating circuit under other conditions, operating means therefor, means controlling said operating means affected by the condition of the battery, means controlling the effect produced by said operating means affected by the current supplied by the source and allowing said operating means to shift the connection of the source from the battery circuit to the translating circuit and vice versa only when the current output of the source is below a predetermined value, and means for manipulating the regulator to affect the source comprehending a normally ineffective voltage coil across said source and another coil coöperating therewith affected by the controlling means.

14. The combination with a controllable source of electrical potential difference, a regulator therefor, a storage battery circuit and a translating circuit, of means for connecting the source with the battery circuit under certain conditions and with the translating circuit under other conditions, operating means therefor, means controlling said operating means affected by the current supplied to the battery, means controlling the effect produced by said operating means affected by the current supplied by the source and allowing said operating means to shift the connection of the source from the battery circuit to the translating circuit and vice versa only when the current output of the source is below a predetermined value, and means for manipulating the regulator to affect the source comprehending a normally ineffective voltage coil across said source and another coil coöperating therewith affected by the controlling means.

15. The combination with a controllable source of electrical potential difference, a regulator therefor, a storage battery circuit and a translating circuit, of means for connecting the source with the battery circuit under certain conditions and with the translating circuit under other conditions, operating means therefor, means controlling said operating means affected by the current supplied by the battery, means controlling the effect produced by said operating means affected by the current supplied by the source and allowing said operating means to shift the connection of the source from the battery circuit to the translating circuit and vice versa only when the current output of the source is below a predetermined value, and means for manipulating the regulator to affect the source comprehending a normally ineffective voltage coil across said source and another coil coöperating therewith affected by the controlling means.

16. The combination with a controllable source of electrical potential difference, a regulator therefor, a storage battery circuit and a translating circuit, of means for connecting the source with the battery circuit under certain conditions and with the translating circuit under other conditions, operating means therefor, means controlling said operating means affected by the current supplied to and by the battery, means controlling the effect produced by said operating means affected by the current supplied by the source and allowing said operating means to shift the connection of the generator from the battery circuit to the translating circuit and vice versa only when the current output of the source is below a predetermined value, and means for manipulating the regulator to affect the source comprehending a normally ineffective voltage coil across said source and another coil coöperating therewith affected by the controlling means.

17. The combination with a controllable source of electrical potential difference, a storage battery circuit and a translating circuit, and means for connecting the source under certain conditions with the battery circuit and under other conditions with the translating circuit, of a regulator for the source, current responsive means adapted to control said regulator to prevent excess of a predetermined maximum current in a circuit supplied by the source, voltage responsive means ineffective during charging of the battery and adapted to affect the regulator to prevent the voltage of the source exceeding a predetermined limit above the voltage necessary to charge the battery, and voltage responsive means across the translating circuit adapted to operate said regulator to limit the voltage impressed upon the translating circuit by said source.

18. The combination with a controllable source of electrical potential difference, a storage battery circuit and a translating circuit and means for connecting the source under certain conditions with the battery circuit and under other conditions with the translating circuit, of a regulator for the source, current responsive means adapted to control said regulator to prevent excess of a predetermined maximum current in a circuit supplied by the source, voltage responsive means ineffective during charging of the battery and adapted to affect the regulator to prevent the voltage of the source exceeding a predetermined limit above the voltage necessary to charge the battery, and voltage responsive means across the translating circuit adapted to operate said regulator to limit the voltage impressed upon the translating circuit by said source and regulating said source when the same is connected with the translating circuit.

19. The combination with a controllable source of electrical potential difference, a storage battery circuit and a translating circuit and means for connecting the source under certain conditions with the battery circuit and under other conditions with the translating circuit, of a regulator for the source, current responsive means adapted to control said regulator to prevent excess of a predetermined maximum current in a circuit supplied by the source, voltage responsive means ineffective during charging of the battery and adapted to affect the regulator to prevent the voltage of the source exceeding a predetermined limit above the voltage necessary to charge the battery, voltage responsive means across the translating circuit adapted to operate said regulator to limit the voltage impressed upon the translating circuit by said source, a translating circuit regulator, and means whereby the same affects said voltage responsive means.

20. The combination with a controllable source of electrical potential difference, a regulator controlling the same, a storage battery circuit and a translating circuit, automatic means for connecting the source with the battery circuit under certain conditions and with the translating circuit under other conditions, operating means for said automatic means, means for controlling said operating means affected by the condition of charge and discharge of the battery, and means for controlling the effect produced by said operating means affected by the activity of the source allowing the operating means to shift the connection of the source from the battery circuit to the translating circuit, and vice versa, only when the activity of the source is below a predetermined value, of means for affecting the regulator to reduce the activity of the source sufficiently to allow the operating means to shift the connection of the source affected by the condition of charge and discharge of the battery.

21. The combination with a generator, a regulator therefor, a storage battery and translating devices, a circuit for the generator, a translating circuit regulator dividing the same in effect into a translating circuit and a battery circuit, automatic means for connecting the generator upon opposite sides of said translating circuit regulator, means for governing said automatic means affected in opposite directions by charge and discharge of the battery, and means for affecting the generator connecting means depending upon the activity of the generator controlling the change of connections from the battery circuit to the translating circuit, of means for affecting the generator regulator to alter the activity of the generator operated by the governing means.

JOHN L. CREVELING.